(12) United States Patent
Kim et al.

(10) Patent No.: US 10,267,528 B2
(45) Date of Patent: Apr. 23, 2019

(54) AIR CONDITIONING APPARATUS

(71) Applicant: LG ELECTRONICS INC., Seoul (KR)

(72) Inventors: Taeyoon Kim, Seoul (KR); Ahram Kim, Seoul (KR); Chungook Chong, Seoul (KR); Daegeun Son, Seoul (KR); Hojung Kim, Seoul (KR); Hooncheol Jeon, Seoul (KR); Hyuckju Kwon, Seoul (KR); Hyungho Park, Seoul (KR); Inho Choi, Seoul (KR); Jeongtaek Park, Seoul (KR); Jieun Choi, Seoul (KR); Jinuk Kim, Seoul (KR); Jongsu Lee, Seoul (KR); Jungwoo Lee, Seoul (KR); Kunyoung Lee, Seoul (KR); Kyoungho Lee, Seoul (KR); Sanghyuk Son, Seoul (KR); Sunyoung Moon, Seoul (KR); Unchang Jeong, Seoul (KR); Woongi Kil, Seoul (KR); Yanghwa Lee, Seoul (KR); Yongmin Kim, Seoul (KR); Younggu Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 43 days.

(21) Appl. No.: 15/339,568

(22) Filed: Oct. 31, 2016

(65) Prior Publication Data

US 2017/0122603 A1    May 4, 2017

Related U.S. Application Data

(60) Provisional application No. 62/248,463, filed on Oct. 30, 2015, provisional application No. 62/252,017, (Continued)

(30) Foreign Application Priority Data

| Nov. 7, 2015 | (KR) | 10-2015-0156254 |
| Nov. 7, 2015 | (KR) | 10-2015-0156255 |

(Continued)

(51) Int. Cl.
B01F 3/04 (2006.01)
B01D 50/00 (2006.01)
(Continued)

(52) U.S. Cl.
CPC ............ F24F 6/04 (2013.01); B01D 46/0035 (2013.01); B01D 46/10 (2013.01); B01D 50/00 (2013.01);
(Continued)

(58) Field of Classification Search
CPC .... B01F 3/04; B01F 3/04007; B01F 3/04021; B01D 50/00; F24F 3/14
(Continued)

(56) References Cited

U.S. PATENT DOCUMENTS

| 2007/0035044 A1 | 2/2007 | Chiu |
| 2015/0115481 A1 | 4/2015 | Jang et al. |

FOREIGN PATENT DOCUMENTS

| CN | 202902510 U | * 4/2013 | ............... F24F 5/00 |
| CN | 204063427 U | 12/2014 | |

(Continued)

OTHER PUBLICATIONS

LG Electronics Inc.—LG Signature Catalog, "Model Name: AW141YAW", Mar. 17, 2016.

*Primary Examiner* — Robert A Hopkins
(74) *Attorney, Agent, or Firm* — Dentons US LLP

(57) ABSTRACT

Provided is an air conditioning apparatus. The air conditioning apparatus includes an air cleaner and an air washer coupled to the air cleaner.

2 Claims, 9 Drawing Sheets

Related U.S. Application Data filed on Nov. 6, 2015, provisional application No. 62/355,118, filed on Jun. 27, 2016.

(30) Foreign Application Priority Data

| Date | | Number |
|---|---|---|
| Nov. 7, 2015 | (KR) | 10-2015-0156256 |
| Nov. 7, 2015 | (KR) | 10-2015-0156257 |
| Nov. 7, 2015 | (KR) | 10-2015-0156258 |
| Dec. 24, 2015 | (KR) | 10-2015-0185841 |
| Dec. 24, 2015 | (KR) | 10-2015-0185846 |
| Dec. 24, 2015 | (KR) | 10-2015-0185850 |
| Dec. 24, 2015 | (KR) | 10-2015-0185854 |
| Dec. 24, 2015 | (KR) | 10-2015-0185856 |
| Dec. 24, 2015 | (KR) | 10-2015-0185857 |
| Dec. 24, 2015 | (KR) | 10-2015-0185864 |
| Dec. 24, 2015 | (KR) | 10-2015-0185869 |
| Dec. 24, 2015 | (KR) | 10-2015-0185876 |
| Dec. 24, 2015 | (KR) | 10-2015-0186044 |
| Dec. 24, 2015 | (KR) | 10-2015-0186153 |
| Dec. 31, 2015 | (KR) | 10-2015-0191540 |
| Mar. 28, 2016 | (KR) | 10-2016-0037235 |
| Mar. 28, 2016 | (KR) | 10-2016-0037246 |
| Mar. 28, 2016 | (KR) | 10-2016-0037255 |
| Jun. 30, 2016 | (KR) | 10-2016-0083053 |
| Jun. 30, 2016 | (KR) | 10-2016-0083054 |
| Jun. 30, 2016 | (KR) | 10-2016-0083061 |
| Jun. 30, 2016 | (KR) | 10-2016-0083062 |
| Jun. 30, 2016 | (KR) | 10-2016-0083066 |
| Jun. 30, 2016 | (KR) | 10-2016-0083071 |
| Jun. 30, 2016 | (KR) | 10-2016-0083074 |
| Jun. 30, 2016 | (KR) | 10-2016-0083081 |
| Jun. 30, 2016 | (KR) | 10-2016-0083087 |
| Jun. 30, 2016 | (KR) | 10-2016-0083106 |
| Jul. 1, 2016 | (KR) | 10-2016-0083227 |
| Sep. 2, 2016 | (KR) | 10-2016-0113455 |
| Sep. 2, 2016 | (KR) | 10-2016-0113456 |
| Sep. 22, 2016 | (KR) | 10-2016-0121745 |
| Oct. 6, 2016 | (KR) | 10-2016-0129309 |
| Oct. 6, 2016 | (KR) | 10-2016-0129310 |
| Oct. 6, 2016 | (KR) | 10-2016-0129311 |
| Oct. 6, 2016 | (KR) | 10-2016-0129312 |
| Oct. 6, 2016 | (KR) | 10-2016-0129313 |
| Oct. 6, 2016 | (KR) | 10-2016-0129314 |
| Oct. 6, 2016 | (KR) | 10-2016-0129315 |
| Oct. 6, 2016 | (KR) | 10-2016-0129316 |
| Oct. 6, 2016 | (KR) | 10-2016-0129317 |
| Oct. 6, 2016 | (KR) | 10-2016-0129318 |
| Oct. 6, 2016 | (KR) | 10-2016-0129319 |
| Oct. 6, 2016 | (KR) | 10-2016-0129320 |
| Oct. 6, 2016 | (KR) | 10-2016-0129321 |
| Oct. 6, 2016 | (KR) | 10-2016-0129322 |
| Oct. 6, 2016 | (KR) | 10-2016-0129323 |
| Oct. 6, 2016 | (KR) | 10-2016-0129324 |

(51) Int. Cl.
| | |
|---|---|
| *F24F 3/14* | (2006.01) |
| *F24F 6/04* | (2006.01) |
| *B01D 46/10* | (2006.01) |
| *F24F 13/28* | (2006.01) |
| *B01D 46/00* | (2006.01) |
| *F24F 6/00* | (2006.01) |
| *F24F 3/16* | (2006.01) |

(52) U.S. Cl.
CPC ............ *B01F 3/04007* (2013.01); *F24F 3/14* (2013.01); *F24F 13/28* (2013.01); *B01D 2279/50* (2013.01); *F24F 3/1603* (2013.01); *F24F 2006/008* (2013.01); *F24F 2006/046* (2013.01)

(58) Field of Classification Search
USPC .................................................. 96/243, 281
See application file for complete search history.

(56) References Cited

FOREIGN PATENT DOCUMENTS

| | | |
|---|---|---|
| CN | 104315643 A | 1/2015 |
| JP | 2003-307327 A | 10/2003 |
| JP | 2005-274041 A | 10/2005 |
| JP | 2015-59671 A | 3/2015 |
| JP | 2015-075285 A | 4/2015 |
| JP | 2015-143603 A | 8/2015 |
| KR | 10-2012-0076284 A | 7/2012 |
| KR | 10-2015-0017431 A | 2/2015 |
| WO | 2012/091369 A2 | 7/2012 |
| WO | 2015/098984 A1 | 7/2015 |

\* cited by examiner

AIR CONDITIONING APPARATUS

CROSS-REFERENCE TO RELATED APPLICATIONS

This U.S. non-provisional patent application claims priority to: U.S. Provisional Application No. 62/248,463, filed on Oct. 30, 2015; U.S. Provisional Application No. U.S. 62/252,017, filed on Nov. 6, 2015; Korean Patent Application No. 10-2015-0156254, filed on Nov. 7, 2015; Korean Patent Application No. 10-2015-0156255, filed on Nov. 7, 2015; Korean Patent Application No. 10-2015-0156256, filed on Nov. 7, 2015; Korean Patent Application No. 10-2015-0156257, filed on Nov. 7, 2015; Korean Patent Application No. 10-2015-0156258, filed on Nov. 7, 2015; Korean Patent Application No. 10-2015-0185841, filed on Dec. 24, 2015; Korean Patent Application No. 10-2015-0185846, filed on Dec. 24, 2015; Korean Patent Application No. 10-2015-0185850, filed on Dec. 24, 2015; Korean Patent Application No. 10-2015-0185854, filed on Dec. 24, 2015; Korean Patent Application No. 10-2015-0185856, filed on Dec. 24, 2015; Korean Patent Application No. 10-2015-0185857, filed on Dec. 24, 2015; Korean Patent Application No. 10-2015-0185864, filed on Dec. 24, 2015; Korean Patent Application No. 10-2015-0185869, filed on Dec. 24, 2015; Korean Patent Application No. 10-2015-0185876, filed on Dec. 24, 2015; Korean Patent Application No. 10-2015-0186044, filed on Dec. 24, 2015; Korean Patent Application No. 10-2015-0186153, filed on Dec. 24, 2015; Korean Patent Application No. 10-2015-0191540, filed on Dec. 31, 2015; Korean Patent Application No. 10-2016-0037235, filed on Mar. 28, 2016; Korean Patent Application No. 10-2016-0037246, filed on Mar. 28, 2016; Korean Patent Application No. 10-2016-0037255, filed on Mar. 28, 2016; U.S. Provisional Application No. U.S. 62/355,118, filed on Jun. 27, 2016; Korean Patent Application No. 10-2016-0083053, filed on Jun. 30, 2016; Korean Patent Application No. 10-2016-0083054, filed on Jun. 30, 2016; Korean Patent Application No. 10-2016-0083061, filed on Jun. 30, 2016; Korean Patent Application No. 10-2016-0083062, filed on Jun. 30, 2016; Korean Patent Application No. 10-2016-0083066, filed on Jun. 30, 2016; Korean Patent Application No. 10-2016-0083071, filed on Jun. 30, 2016; Korean Patent Application No. 10-2016-0083074, filed on Jun. 30, 2016; Korean Patent Application No. 10-2016-0083081, filed on Jun. 30, 2016; Korean Patent Application No. 10-2016-0083087, filed on Jun. 30, 2016; Korean Patent Application No. 10-2016-0083106, filed on Jun. 30, 2016; Korean Patent Application No. 10-2016-0083227, filed on Jul. 1, 2016; Korean Patent Application No. 10-2016-0113455, filed on Sep. 2, 2016; Korean Patent Application No. 10-2016-0113456, filed on Sep. 2, 2016; Korean Patent Application No. 10-2016-0121745, filed on Sep. 22, 2016; Korean Patent Application No. 10-2016-0129309, filed on Oct. 6, 2016; Korean Patent Application No. 10-2016-0129310, filed on Oct. 6, 2016; Korean Patent Application No. 10-2016-0129311, filed on Oct. 6, 2016; Korean Patent Application No. 10-2016-0129312, filed on Oct. 6, 2016; Korean Patent Application No. 10-2016-0129313, filed on Oct. 6, 2016; Korean Patent Application No. 10-2016-0129314, filed on Oct. 6, 2016; Korean Patent Application No. 10-2016-0129315, filed on Oct. 6, 2016; Korean Patent Application No. 10-2016-0129316, filed on Oct. 6, 2016; Korean Patent Application No. 10-2016-0129317, filed on Oct. 6, 2016; Korean Patent Application No. 10-2016-0129318, filed on Oct. 6, 2016; Korean Patent Application No. 10-2016-0129319, filed on Oct. 6, 2016; Korean Patent Application No. 10-2016-0129320, filed on Oct. 6, 2016; Korean Patent Application No. 10-2016-0129321, filed on Oct. 6, 2016; Korean Patent Application No. 10-2016-0129322, filed on Oct. 6, 2016; Korean Patent Application No. 10-2016-0129323, filed on Oct. 6, 2016; Korean Patent Application No. 10-2016-0129324, filed on Oct. 6, 2016; Korean Patent Application No. 10-2016-0129355, filed on Oct. 6, 2016; Korean Patent Application No. 10-2016-0135195, filed on Oct. 18, 2016; and Korean Patent Application No. 10-2016-0139828, filed on Oct. 26, 2016, the entire contents of which are hereby incorporated by reference.

This U.S. non-provisional patent application is directed to an air conditioning apparatus, which may include a combination(s) of one or more of any embodiment or feature disclosed in U.S. patent application Ser. Nos. 15/337,304; 15/337,451; 15/337,575; 15/337,895; 15/337,906; 15/337,914; 15/337,926; 15/337,930; 15/337,944; 15/337,974; 15/338,015; 15/338,065; 15/338,067; 15/338,093; 15/338,112; 15/338,136; 15/338,137; 15/338,146; 15/338,153; 15/338,160; 15/338,163; 15/338,257; 15/338,261; 15/338,264; 15/338,267; 15/338,270; 15/338,283; 15/338,286; and Ser. No. 15/338,292, which were filed on Oct. 28, 2016 in the United States Patent and Trademark Office, the entire contents of which are hereby incorporated by reference for any and all purposes thereof.

BACKGROUND OF THE INVENTION

The present invention disclosed herein relates to an apparatus for both humidification and air cleaning.

Air conditioning apparatuses include air conditioners that control the temperature of air, air cleaners that remove foreign substances from air to maintain air cleanliness, humidifiers that increase humidity in the air, and dehumidifiers that reduce humidity in the air.

Typical humidifiers are classified into a vibration type which atomizes water on a vibrating plate and discharges it into air and a natural evaporation type that evaporates water in a humidification filter.

The natural evaporation type of humidifier is classified into a disc type of humidifier which rotates a disc using a driving force and allows water to naturally evaporate from the surface of the disc in the air and a humidification filter type of humidifier which allows water to naturally evaporate from a wet humidification medium by flowing air.

In a typical humidifier, a portion of flowing air during the humidification process is filtered by a filter.

However, since a typical humidifier is used only in a low humidity season and an air cleaner has no humidification function, a user needs to purchase both products.

Also, since a typical humidifier has an air cleaning function as an additional function in addition to a humidification function as a main function, the air cleaning function is weak.

Furthermore, there is a limitation in that a typical humidifier or air cleaner cannot separately operate the humidification or air cleaning function.

SUMMARY OF THE INVENTION

The present invention provides a humidification and air cleaning apparatus which can separately operate a humidification function and an air cleaning function.

The present invention also provides a humidification and air cleaning apparatus which allows a user to check water drops formed on a humidification flow passage with his/her eyes and to intuitively know the humidification state.

The present invention also provides a humidification and air cleaning apparatus which includes an air wash module performing humidification and disposed in an air clean module performing air cleaning, and can supply filtered air of the air clean module to the air wash module through a connection flow passage.

The present invention also provides a humidification and air cleaning apparatus in which filtering and humidification of air are performed until suctioned air is discharged and in which the flow direction of air is minimized.

The present invention also provides a humidification and air cleaning apparatus which can sufficiently secure the flow rate by supplying filtered air in all directions of 360 degrees when filtered air is humidified.

The present invention also provides a humidification and air cleaning apparatus in which filtered air is humidified while passing a water tank humidification medium disposed at an inlet of a humidification flow passage and in which filtered air is additionally humidified while passing a discharge humidification medium disposed at an outlet of the humidification flow passage.

The present invention also provides a humidification and air cleaning apparatus which washes filtered air by scattering water drops when a humidification medium is wetted.

The present invention also provides a humidification and air cleaning apparatus in which a humidification medium is disposed to be spaced from water of a water tank and can maintain a dry state when humidification mode does not operate.

The objectives of the present invention are not limited to the above-mentioned objectives, and other objectives that are not mentioned will be clearly understood by persons skilled in the art from the following description.

Embodiments of the present invention provide humidification and air cleaning apparatuses comprising: an air clean module suctioning external air and generating filtered air by filtering suctioned external air; and an air wash module separably placed on the air clean module, supplied with filtered air from the air clean module, and humidifying filtered air, wherein: the air clean module comprises: an intake flow passage suctioning air; a filtering flow passage connected to the intake flow passage, allowing air suctioned through the intake flow passage to be filtered, and allowing filtered air to flow therein; and a clean connection flow passage connected to the filtering flow passage and providing filtered air to the air wash module; the air wash module comprises: a humidification connection flow passage to which filtered air is provided; a humidification flow passage connected to the humidification connection flow passage and supplying moisture to filtered air in order to form humidified air; and a discharge flow passage connected to the humidification flow passage and discharging humidified air to the outside; and when the air wash module is placed on the air clean module, the humidification connection flow passage and the clean connection flow passage are connected to each other.

In some embodiments, the filtering flow passage may be formed in upward and downward directions and external air flows from a lower side to an upper side; the humidification flow passage is formed in upward and downward directions and filtered air flows from a lower side to an upper side; and an air guide is disposed in at least one of the clean connection flow passage and the humidification connection flow passage to change a flow direction of filtered air.

In some embodiments, the air wash module may further comprises a water tank forming at least a portion of the humidification flow passage and communicating with the humidification connection flow passage, and the air guide forms at least a portion of the clean connection flow passage, and guides filtered air to the humidification connection flow passage.

In some embodiments, when the air wash module is placed on the air clean module, the air guide may be disposed to cover the water tank, and the air guide may guide filtered air in all directions of 360 degrees of the water tank, and filtered air guided by the air guide may be guided to the humidification flow passage.

In some embodiments, the air wash module may further comprise an air wash inlet communicating with the humidification connection flow passage and guiding filtered air to the humidification flow passage, and when the air wash module is placed on the air clean module, the humidification flow passage and the clean connection flow passage are connected to each other through the air wash inlet.

In some embodiments, the air wash module may further include a water tank storing water and forming the humidification flow passage; the air clean module has a water tank insertion space receiving at least a portion of the water tank; and when the water tank is inserted into the water tank insertion space and the air wash module is placed on the air clean module, the humidification flow passage and the clean connection flow passage may be connected to each other through the air wash inlet.

In some embodiments, the air wash module may further include a water tank humidification medium spaced from water stored in the water tank, and the water tank humidification medium is disposed at the air wash inlet and provides moisture to filtered air flowing to the humidification flow passage through the air wash inlet when the water tank humidification medium is wetted by being supplied with water stored in the water tank.

In some embodiments, the air wash module may further include a discharge humidification medium disposed between the humidification flow passage and the discharge flow passage, and the water tank humidification medium may provide moisture to filtered air flowing from the humidification flow passage to the discharge flow passage when the water tank humidification medium is wetted by being supplied with water stored in the water tank.

In some embodiments, the air wash module may further include a water supply flow passage supplied with water and guiding supplied water to the humidification flow passage, and the water supply flow passage may be disposed separately from the discharge flow passage.

In some embodiments, the discharge flow passage and the water supply flow passage may be disposed at an upper part of the air wash module, and the water supply flow passage may be disposed inside the discharge flow passage.

In some embodiments, the air wash module may include: a water tank storing water; an air wash inlet communicating with the humidification connection flow passage and guiding filtered air to the humidification flow passage; a watering unit spraying water stored in the water tank; and a water tank humidification medium disposed at the air wash inlet, spaced from water stored in the water tank, and wetted by water sprayed from the watering unit, and when the water tank humidification medium is wetted, may provide moisture to filtered air flowing to the humidification flow passage through the air wash inlet.

In some embodiments, the air wash module may further include a discharge humidification medium disposed between the humidification flow passage and the discharge flow passage, and the water tank humidification medium may provide moisture to filtered air flowing from the humidification flow passage to the discharge flow passage when the water tank humidification medium is wetted by water sprayed from the watering unit.

In some embodiments, the air clean module may have a water tank insertion space receiving at least a portion of the water tank, and when the water tank is inserted into the water tank insertion space and the air wash module is placed on the air clean module, the humidification flow passage and the clean connection flow passage may be connected to each other through the air wash inlet.

In some embodiments, the humidification and air cleaning apparatus may further include an air guide disposed in at least one of the clean connection flow passage and the humidification connection flow passage and changing a flow direction of filtered air. Here, when the air wash module is placed on the air clean module, the air guide may be disposed outside the water tank insertion space, may cover the water tank insertion space, and may guide filtered air to the inside of the water tank insertion space.

In some embodiments, when the air wash module is placed on the air clean module, the air guide may be disposed to cover the water tank, and the air guide may guide filtered air in all directions of 360 degrees of the water tank, and filtered air guided by the air guide may be guided to the humidification flow passage.

In some embodiments, the air wash inlet may be formed in all directions of 360 degrees, and the water tank humidification medium may be disposed to cover all directions of 360 degrees in which the air wash inlet is formed.

In some embodiments, the air wash module may further include a water supply flow passage supplied with water and guiding supplied water to the humidification flow passage, and the water supply flow passage may be disposed separately from the discharge flow passage.

In some embodiments, the discharge flow passage and the water supply flow passage may be disposed at an upper part of the air wash module, and the water supply flow passage may be disposed inside the discharge flow passage.

In some embodiments, the air wash module may further include a top cover assembly in which the discharge flow passage and the water supply flow passage are formed; the discharge flow passage may be formed in all directions of 360 degrees along an edge of the top cover assembly, and the water supply flow passage is disposed at a center of the top cover assembly; and the discharge flow passage and the water supply flow passage may all communicate with the humidification flow passage.

In some embodiments, the air clean module may further include an air blowing unit allowing air to flow and comprising an air blowing flow passage formed therein, and the air blowing flow passage may be disposed between the filtering flow passage and the humidification flow passage.

Embodiments of the present invention provide humidification and air cleaning apparatuses including: an air clean module suctioning external air and generating filtered air by filtering suctioned external air; and an air wash module combined with the air clean module, supplied with filtered air from the air clean module, and humidifying filtered air, wherein: the air clean module comprises: an intake flow passage suctioning air; a filtering flow passage connected to the intake flow passage, allowing air suctioned through the intake flow passage to be filtered, and allowing filtered air to flow therein; and a clean connection flow passage connected to the filtering flow passage and providing filtered air to the air wash module; the air wash module comprises: a humidification connection flow passage to which filtered air is provided; a humidification flow passage connected to the humidification connection flow passage and supplying moisture to filtered air in order to form humidified air; and a discharge flow passage connected to the humidification flow passage and discharging humidified air to the outside; and the humidification connection flow passage and the clean connection flow passage are connected to each other.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
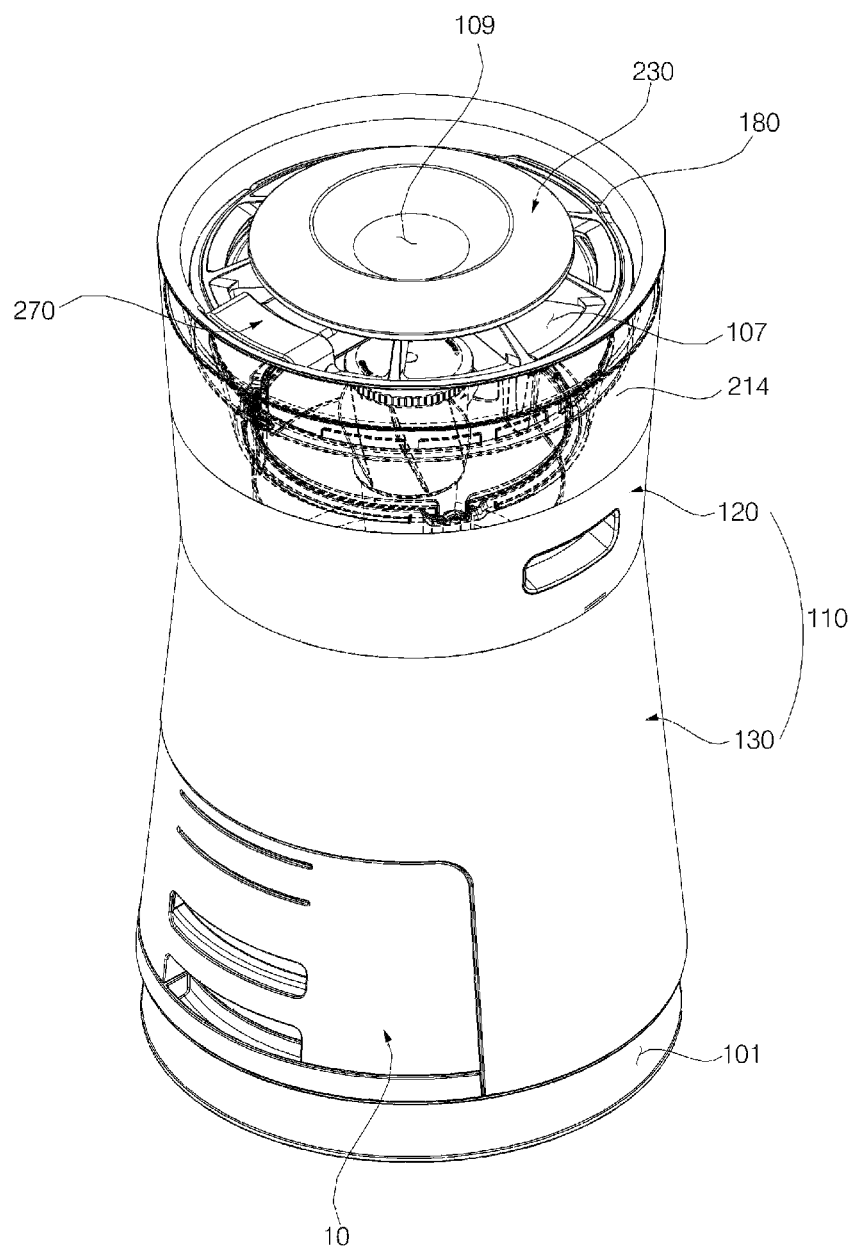
FIG. 1 is a perspective view illustrating a humidification and air cleaning apparatus according to a first embodiment of the present invention.

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Hereinafter, it will be described about an exemplary embodiment of the present invention in conjunction with the accompanying drawings.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Hereinafter, exemplary embodiments of the present invention will be described in detail with reference to the accompanying drawings.

Figure 2:
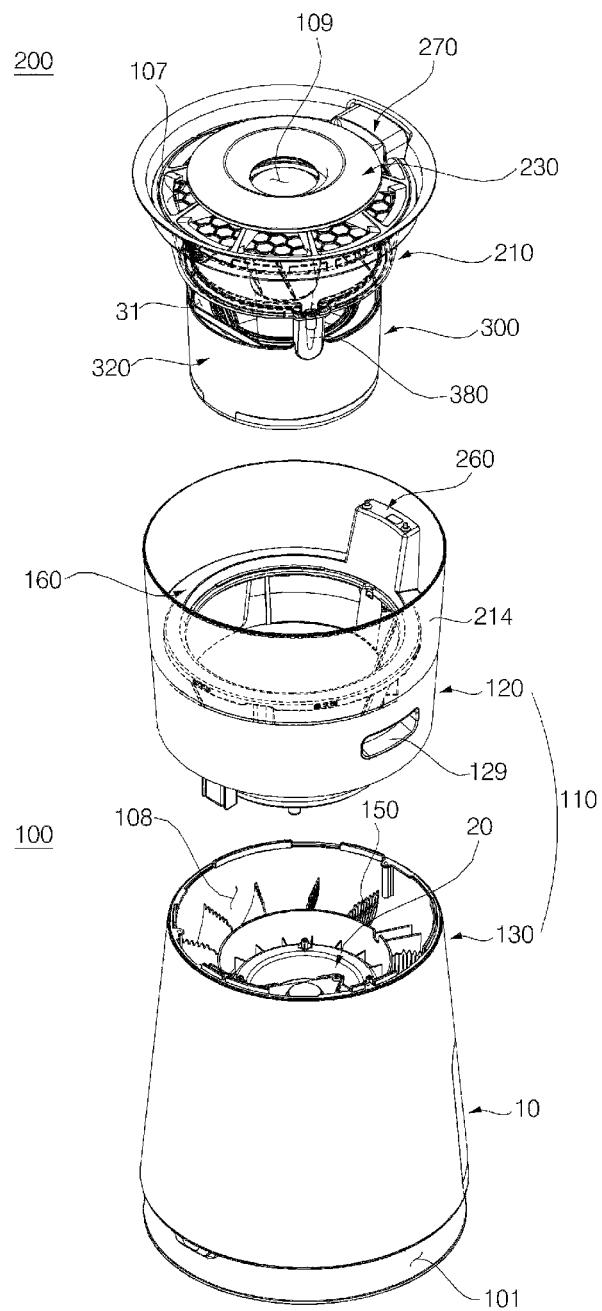
FIG. 2 is an exploded perspective view of FIG. 1.
Figure 3:
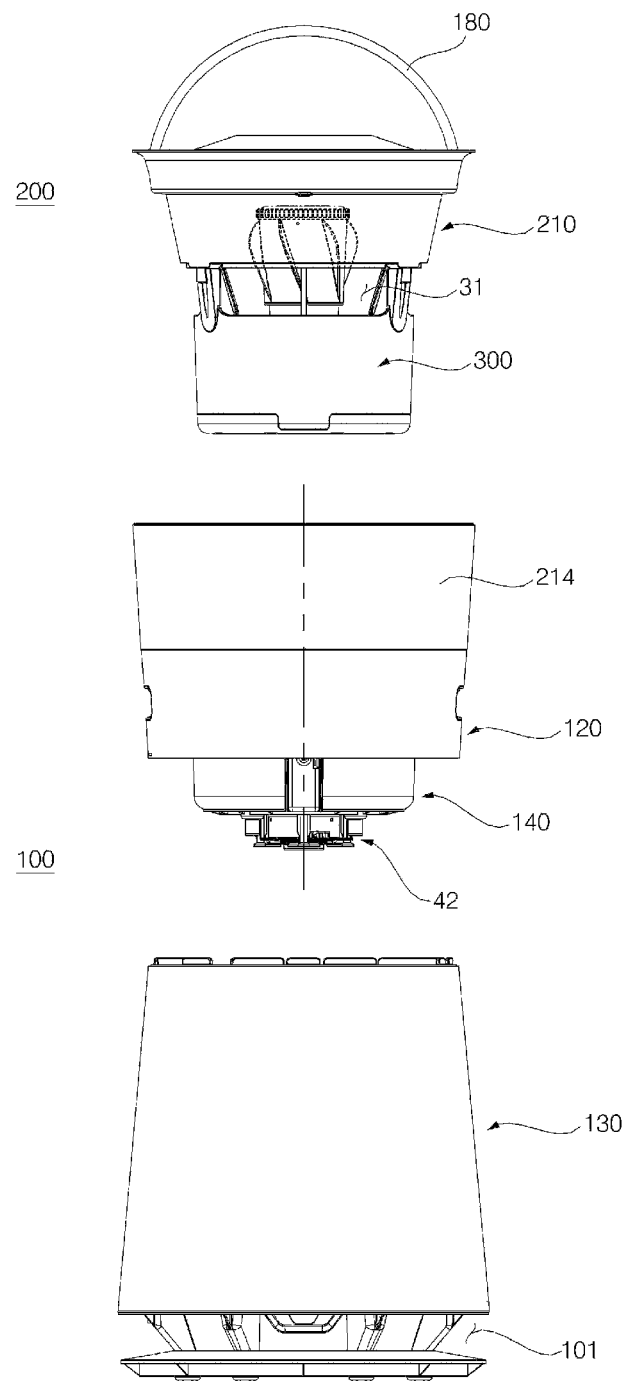
FIG. 3 is an exploded front view of FIG. 1.
Figure 4:
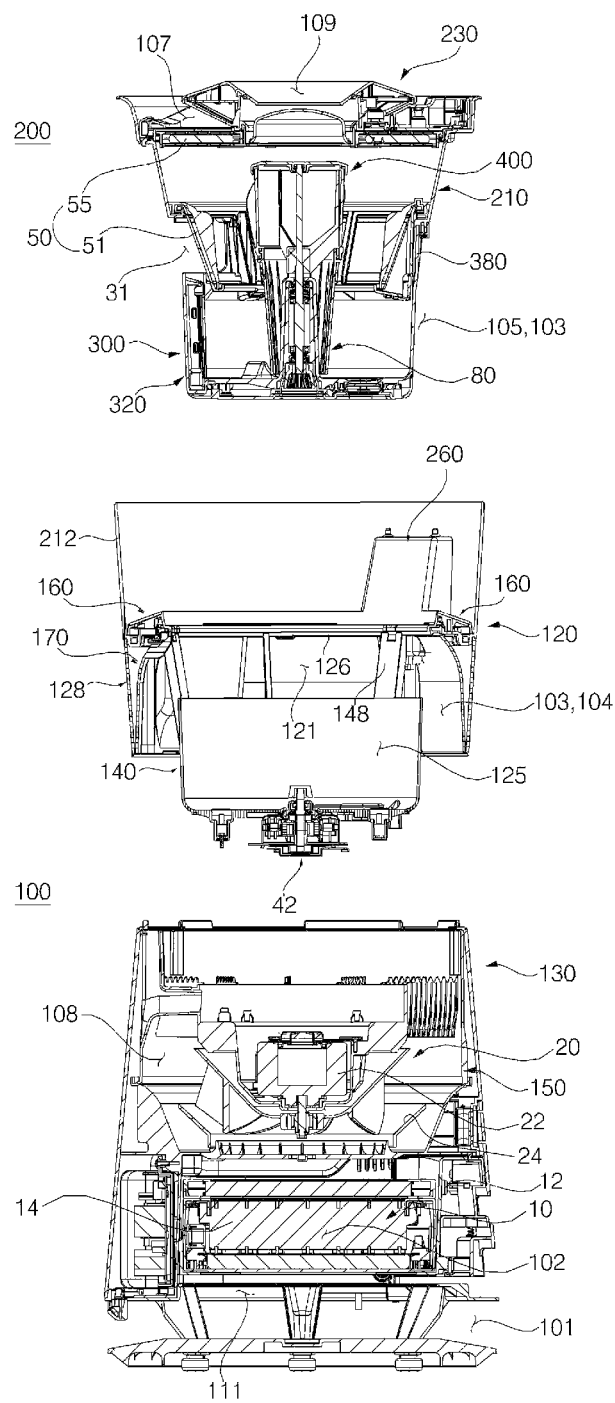
FIG. 4 is an exploded cross-sectional view of FIG. 3.
Figure 5:
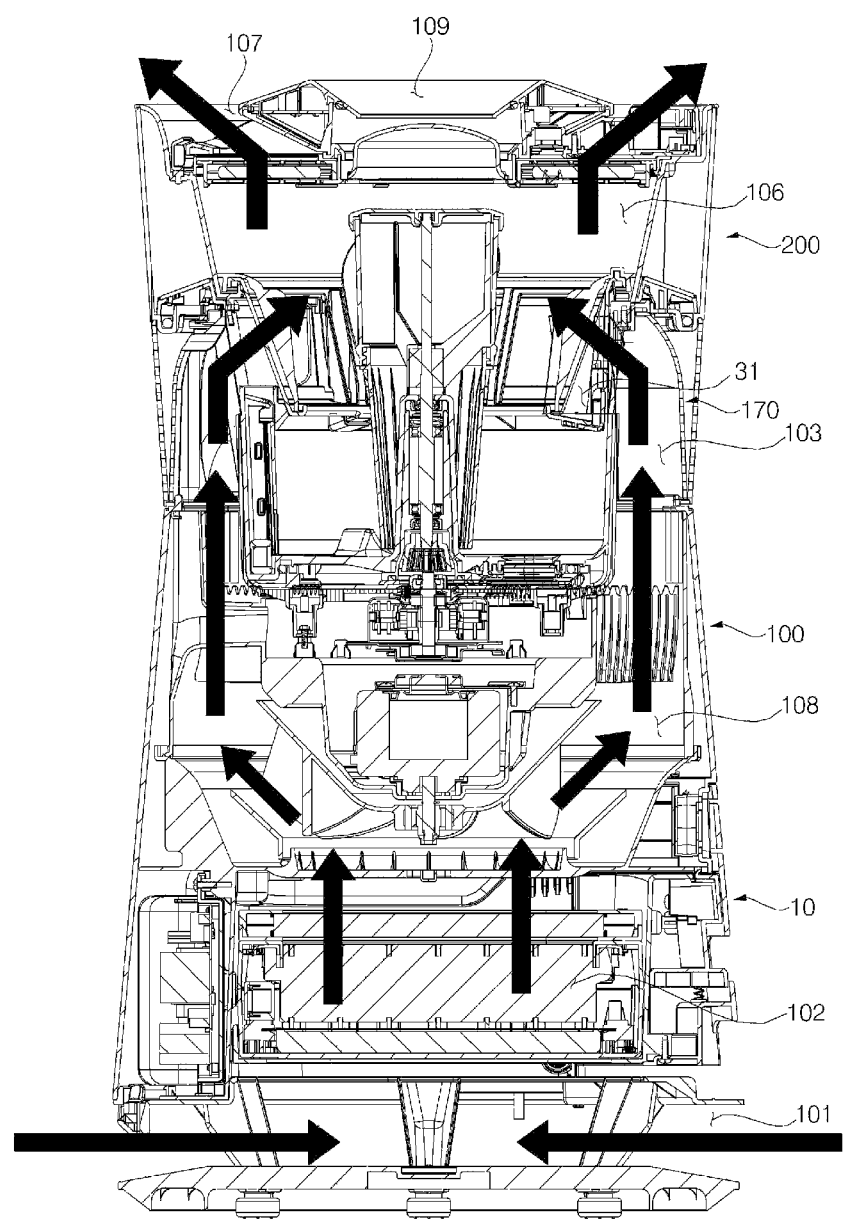
FIG. 5 is a view illustrating an air flow of the humidification and air cleaning apparatus according to the first embodiment of the present invention.
Figure 6:
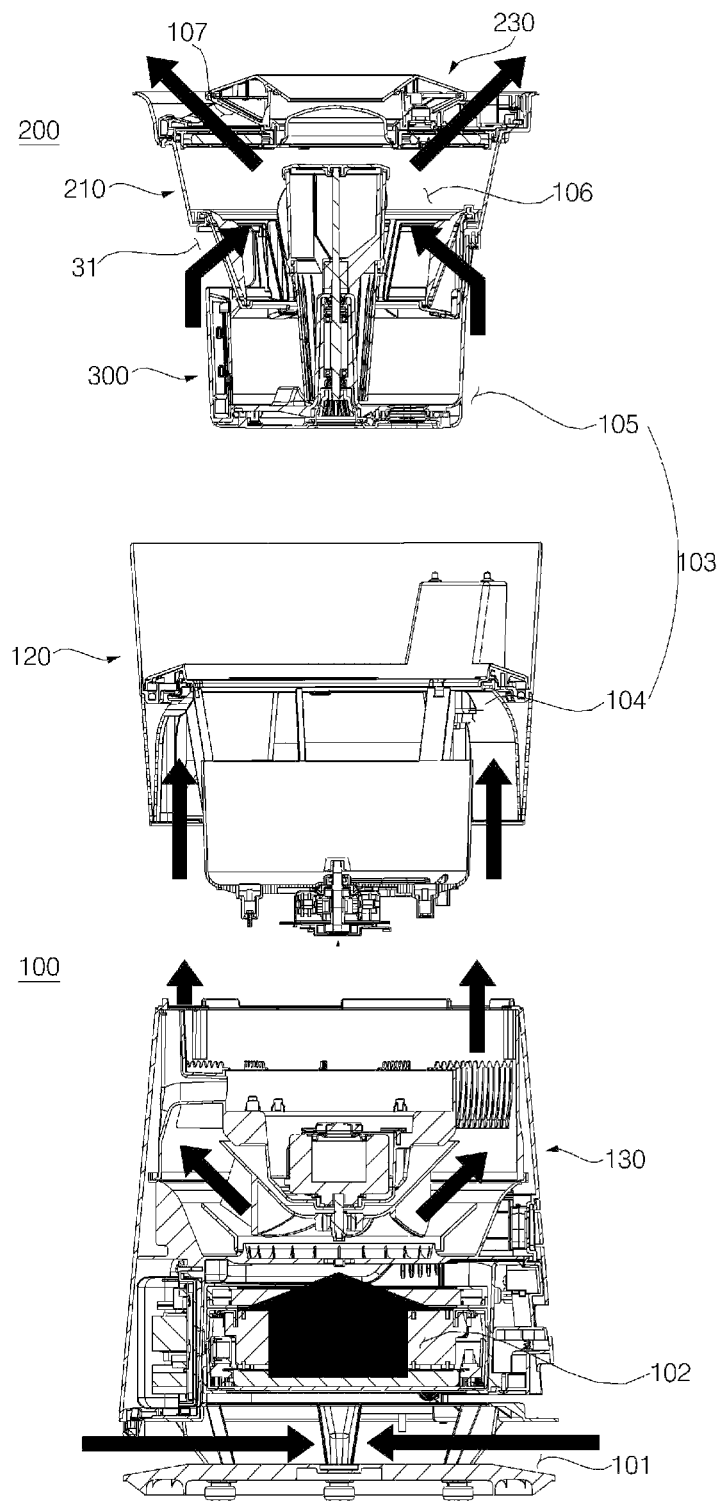
FIG. 6 is a view illustrating an air flow of the humidification and air cleaning apparatus shown in FIG. 4.
Figure 7:
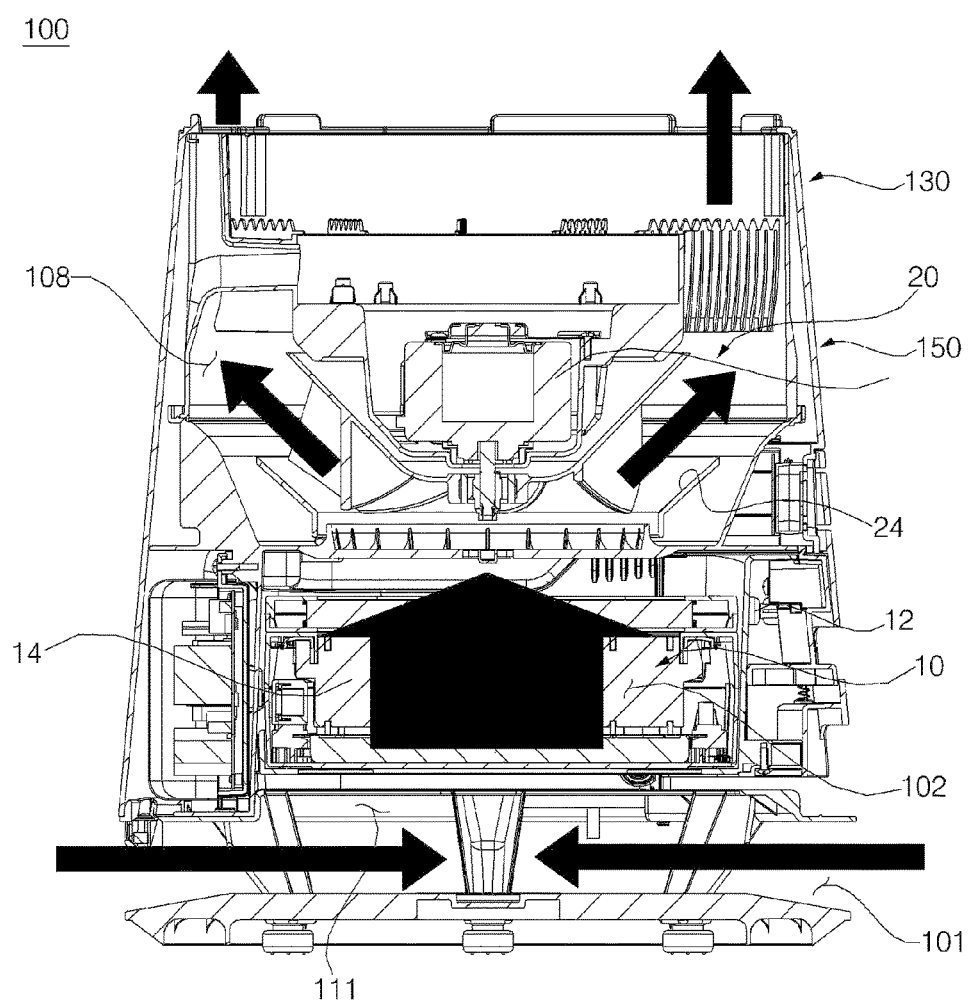
FIG. 7 is a view illustrating an air flow of the lower body shown in FIG. 6.
Figure 8:
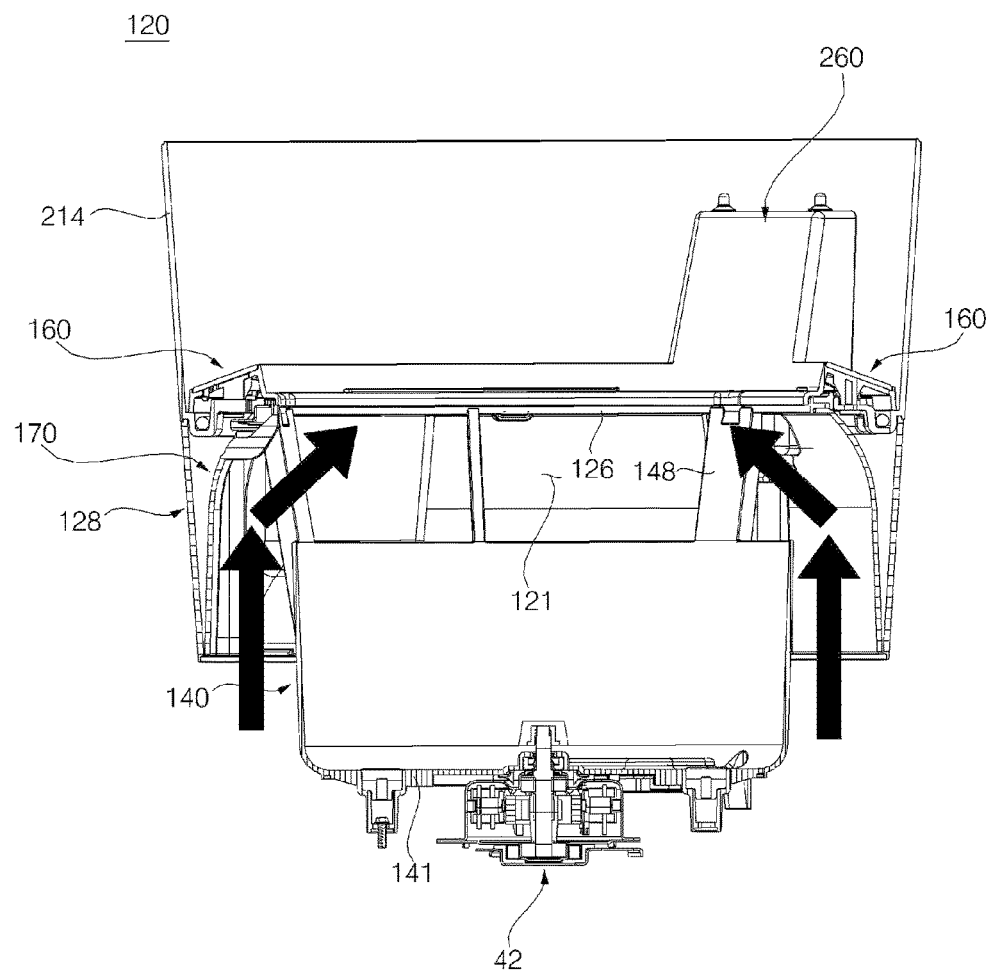
FIG. 8 is a view illustrating an air flow of the upper body shown in FIG. 6.
Figure 9:
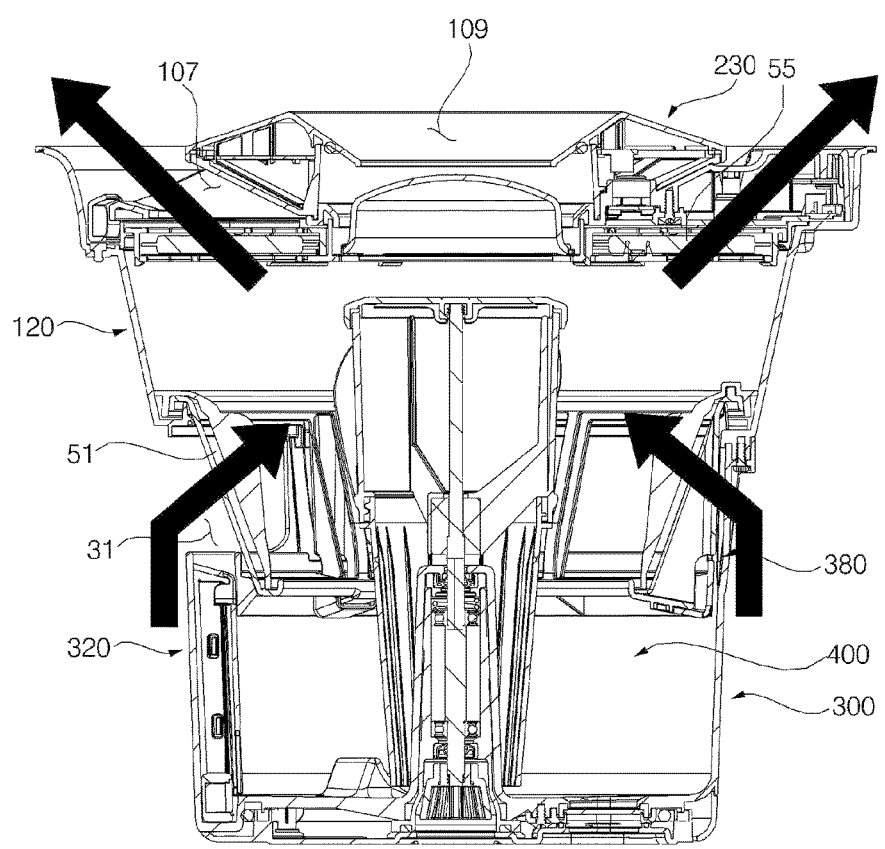
FIG. 9 is a view illustrating an air flow of the air wash module shown in FIG. 6.

FIG. 1 is a perspective view illustrating a humidification and air cleaning apparatus according to a first embodiment of the present invention. FIG. 2 is an exploded perspective view of FIG. 1. FIG. 3 is an exploded front view of FIG. 1. FIG. 4 is an exploded cross-sectional view of FIG. 3.

A humidification and air cleaning apparatus according to an embodiment of the present invention may include an air clean module 100 and an air wash module 200 disposed over the air clean module 100.

The air clean module 100 may take in and filter external air, and may provide filtered air to the air wash module 200. The air wash module 200 may be supplied with filtered air, may perform humidification to provide moisture, and may discharge humidified air to the outside.

The air wash module 200 may include a water tank 300 for storing water. The water tank 300 may be separable from the air clean module 100 when the air wash module 200 is separated. The air wash module 200 may be disposed over the air clean module 100.

A user can separate the air wash module 200 from the air clean module 100, and can clean the air wash module 200 that is separated. A user may also clean the inside of the air clean module 100 from which the air wash module 200 is separated. When the air wash module 200 is separated, the upper surface of the air clean module 100 may be opened to a user.

The air clean module 100 may include a filter assembly 10 described later, and may be cleaned after the filter assembly 10 is separated from a base body 110.

A user may supply water into the air wash module 200. The air wash module 200 may have a water supply flow passage 109 formed therein to supply water from the outside to the water tank 300.

The water supply flow passage 109 may be configured to be separated from a discharge flow passage 107 from which air is discharged. The water supply flow passage 109 may be configured to supply water into the water tank 300 at any moment. For example, even when the air wash module 200 is operating, water can be supplied through the water supply flow passage. For example, even when the air wash module 200 is coupled to the air clean module 100, water can be supplied through the water supply flow passage. For example, even when the air wash module 200 is decoupled from the air clean module 100, water can be supplied through the water supply flow passage.

The air clean module 100 and the air wash module 200 may be connected to each other through a connection flow passage 103. Since the air wash module 200 is separable, the connection flow passage 103 may be distributedly disposed at the air clean module 100 and the air wash module 200. Only when the air wash module 200 is placed over the air clean module 100, the flow passage of the air wash module 200 and the flow passage of the air clean module 100 may communicate with each other through the connection flow passage 103.

The connection flow passage formed in the air clean module 100 may be defined as a clean connection flow passage 104, and the connection flow passage formed in the air wash module 200 may be defined as a humidification connection flow passage 105.

The flow of air passing through the air clean module 100 and the air wash module 200 will be described in more detail later.

Hereinafter, the air clean module 100 and the air wash module 200 will be described in more detail.

The air clean module 100 may include a base body 110, a filter assembly 10 that is disposed in the base body 110 and filters air, and an air blowing unit 20 that blows air.

The air wash module 200 may include a water tank 300, a watering unit 400, a humidification medium 50, a visual body 210, and a top cover assembly 230. The water tank 300 may store water for humidification, and may be detachably disposed over the air clean module 100. The watering unit 400 may be disposed in the water tank 300, and may spray water in the water tank 300. The humidification medium 50 may be wetted with water sprayed from the watering unit 400, and may provide moisture to flowing air. The visual body 210 may be coupled to the water tank 300, and may be formed of a transparent material. The top cover assembly 230 may be detachably disposed over the visual body 210, and may include a discharge flow passage 107 through which air is discharged and a water supply flow passage 109 through which water is supplied.

The air clean module 100 may include an intake flow passage 101, a filtering flow passage 102, an air blowing flow passage 108, and a clean connection flow passage 104 disposed therein. Air suctioned through the intake flow passage 101 may flow to the clean connection flow passage 104 via the filtering flow passage 102 and the air blowing flow passage 108.

The air wash module 200 may include a humidification connection flow passage 105, a humidification flow passage 106, a discharge flow passage 107, and a water supply flow passage 109 disposed therein.

When the air wash module 200 is placed over the air clean module 100, the clean connection flow passage 104 of the air clean module 100 and the humidification connection flow passage 105 of the air wash module 200 may be connected to each other.

Filtered air supplied through the humidification connection flow passage 105 of the air wash module 200 may be discharged into the indoor via the humidification flow passage 106 and the discharge flow passage 107. The water supply flow passage 109 may be manufactured into a structure in which air is not discharged and only water is supplied while communicating with the humidification flow passage 106.

First, each configuration of the air clean module 100 will be described.

The base body 110 may include an upper body 120 and a lower body 130. The upper body 120 may be disposed on the lower body 130, and the upper body 120 and the lower body 130 may be assembled.

Air may flow into the base body 110.

The intake flow passage 101, the filtering flow passage 102, and the air blowing flow passage 108 may be disposed in the lower body 130, and structures that define the intake flow passage 101, the filtering flow passage 102, and the air blowing flow passage may be disposed in the lower body 130.

A portion of the connection flow passage 103 may be disposed in the upper body 120, and structures for guiding filtered air to the air wash module 200 and structures for supporting the air wash module 200 may be disposed in the upper body 120.

The base body 110 may include the lower body 130 defining the exterior thereof and having an inlet hole 110 formed in the undersurface thereof, and the upper body 120 defining the exterior thereof and coupled to the upper side of the lower body 130.

The filter assembly 10 may be detachably assembled in the base body 110.

The filter assembly 10 may provide the filtering flow passage 102, and may filter external air. The filter assembly 10 may have a structure that is detachable from the base body 110 in a horizontal direction. The filter assembly 10 may be disposed so as to cross the flowing direction of air that flows upstream in a vertical direction. The filter assembly 10 may slide in a horizontal direction, and may filter air that flows upward in a vertical direction. The filter assembly 10 may be disposed in a horizontal direction, and may form the filtering flow passage 102 in a vertical direction.

The filter assembly 10 may slide in a horizontal direction with respect to the base body 110.

The filter assembly 10 may include a filter housing 11 disposed in the lower body 130 and forming the filtering flow passage 102, and a filter 14 separably coupled to the filter housing 11 and filtering air passing the filtering flow passage 102.

The filter housing 12 may communicate with the intake flow passage 101 at the lower side thereof, and may communicate with the air blowing flow passage 108 at the upper side thereof. Air suctioned through the intake flow passage 101 may flow to the air blowing flow passage 108 via the filtering flow passage 102.

The filter housing 12 may be opened at one side thereof in a direction crossing the filtering flow passage 102. The filter 14 may be detachably coupled through the opened surface of the filter housing 12. The opened surface of the filter housing 12 may be formed in a lateral direction. The opened surface of the filter housing 12 may be disposed on the outer surface of the lower body 130. Accordingly, the filter 14 may be inserted through the side surface of the lower body 130, and may be located inside the filter housing 12. The filter 14 may be disposed to cross the filtering flow passage 102, and may filter air passing the filtering flow passage 102.

The filter 14 may be an electric duct collecting filter that collects foreign substances in the air by electrifying the filter using applied power. The filter 14 may be formed of a material that collects foreign substances in the air through a filter medium. The filter 14 may be disposed in various structures. The scope of the inventive invention is not limited to the filtering method or the filter medium of the filter 14.

The filtering flow passage 102 may be disposed in the same direction as the main flowing direction of the humidification and air cleaning apparatus. In this embodiment, the filtering flow passage 102 may be disposed in a vertical direction, and may allow air to flow in the opposite direction to gravity. That is, the main flowing direction of the humidification and air cleaning apparatus may be formed so as to direct from bottom to top.

The air blowing unit 20 may be disposed over the filter housing 12.

The upper side surface of the filter housing 12 may be opened, and air passing the filtering flow passage 102 may flow to the air blowing unit 20.

The air blowing unit 20 may generate flowing of air. The air blowing unit 20 may be disposed inside the base body 110, and may allow air to flow from the lower side to the upper side.

The air blowing unit 20 may include a blower housing 150, a blower motor 22, and a blower fan 24. In this embodiment, the blower motor 22 may be disposed at an upper side, and the blower fan 24 may be disposed at a lower side. The motor shaft of the blower motor 22 may direct to bottom, and may be coupled to the blower fan 24.

The blower housing 150 may be disposed inside the base body 110. The blower housing 150 may provide a flow passage of flowing air. The blower motor 22 and the blower fan 24 may be disposed in the blower housing 150.

The blower housing 150 may be disposed over the filter assembly 10, and may be disposed under the upper body 120.

The blower housing 150 may form the air blowing flow passage 108 therein. The blower fan 24 may be disposed in the air blowing flow passage 108. The air blowing flow passage 108 may connect the filtering flow passage 102 and the clean connection flow passage 104.

The blower fan 24 may be a centrifugal fan, and may suction air from the lower side thereof and discharge air to the outside in a radial direction. The blower fan 24 may discharge air to the upper side and the outside in a radial direction. The outer end of the blower fan 24 may be disposed to direct to the upper side in a radial direction.

The blower motor 22 may be disposed over the blower fan 24 to minimize contact with flowing air. The blower motor 22 may be installed so as to be covered by the blower fan 24. The blower motor 22 may not be located on the airflow passage by the blower fan 24, and may not generate a resistance against air flowing by the blower fan 24.

The upper body 120 may include an upper outer body 128 forming the exterior of the base body and coupled to the lower body 130, an upper inner body 140 disposed inside the upper outer body 128, having the water tank 300 inserted therein, and providing the connection flow passage 103, and an air guide 170 coupling the upper inner body 140 and the upper outer body 128 and guiding air to the water tank 300.

Since the upper body 120 is disposed to separate the connection flow passage and the water tank insertion space, water of the water tank 300 flowing into the connection flow passage can be minimized. Particularly, since the connection flow passage is divided by the upper inner body 140 and disposed outside a space in which water is stored, water can be inhibited from flowing into the connection flow passage.

The upper inner body 140 may be formed to be opened at the upper side thereof, and may receive the water tank 300. The upper inner body 140 may form a portion of the clean connection flow passage 104 into which filtered air flows.

The upper inner body 140 may have an upper inlet 121 formed therein and corresponding to an air wash inlet 31. The upper inlet 121 may not be an essential component. It may be sufficient if the upper body 120 has a shape that exposes the air wash inlet 31 to the connection flow passage 103.

The air guide 170 may guide air supplied through the clean connection flow passage 104 to the upper inlet 121. The air guide 170 may collect air rising along the outside of the base body 110 toward the inside. The air guide 170 may change the flowing direction of air flowing from the lower side to the upper side. However, the air guide 170 may minimize the flow resistance of air by minimizing the change angle of the flow direction of air.

The air guide 170 may cover the outside of the upper inner body 140 360 degrees of a circumference of the upper inner body 140. The air guide 170 may guide air to the water tank 300 in all directions of 360 degrees of a circumference of the water tank 300. The air guide 170 may inwardly collect air guided along the outside of the lower body 130, and may supply the collected air to the water tank 300. Through this structure, the flow rate of air supplied to the water tank 300 can be sufficiently secured.

Accordingly, the air guide 170 may include a guide part 172 formed in the flowing direction of air, and a change part 174 that is connected to the guide part 172 and changes the flow direction of guided air.

The air guide 170 may form the connection flow passage 103.

The guide part 172 may be formed in the substantially same direction as the filtering flow passage 102, and in this embodiment, may be formed in a vertical direction. The change part 174 may be formed in a direction crossing the filtering flow passage 102, and in this embodiment, may be formed in a substantially horizontal direction.

The change part 174 may be disposed at an upper side of the air guide 170. The change part 174 may be connected to the guide part 172 through a curved surface.

Although the change part 174 is formed in a horizontal direction, air passing the connection flow passage 103 may upwardly flow in a substantially oblique direction. The flow resistance of air can be reduced by allowing the change angle of the connection flow passage 103 and the filtering flow passage 102 to be similar to the straightly traveling direction.

The lower end of the guide part 172 may be fixed to the upper outer body 128. The upper end of the change part 174 may be fixed to the upper inner body 140.

A portion of the clean connection flow passage 104 may be formed outside the upper inner body 140. The air guide 170 may form a portion of the clean connection flow passage 104. Air passing the clean connection flow passage 104 may flow into the water tank 300 through the upper inlet 121 and the air wash inlet 31.

The upper inner body 140 may have a basket shape on the whole. The upper inner body 140 may have a circular shape in horizontal section, and the clean connection flow passage 104 may be formed in all directions of 360 degrees of a circumference of the upper inner body 140.

The air guide 170 may be a component for guiding filtered air to the clean connection flow passage 104, and may be omitted in accordance with embodiments. The air guide 170 may combine the upper inner body 140 or the upper outer body 128.

The air guide 170 may be formed to cover the upper inner body 140. Particularly, the air guide 170 may be formed to cover the upper inlet 121, and may guide filtered air to the upper inlet 121. When viewed from top, the air guide 170 may have a donut shape.

In this embodiment, the upper end of the air guide 170 may adhere closely to the upper end of the upper inner body 140.

When viewed from top, the upper side surface of the air guide 170 may coincide with the upper side surface of the upper inner body 140. In this embodiment, an upper inner body ring 126 may be disposed on the upper end of the upper inner body 140 to be coupled to or adhere closely to the air guide 170.

An inner body extension part 148 may be disposed to connect the upper inner body 140 and the upper inner body ring 126. The inner body extension part 148 may be disposed in plurality. An upper inlet 121 may be formed between the inner body extension part 148 and the upper inner body ring 126.

The inner body extension part 148 may correspond to a water tank body extension part 380. When the water tank 300 is placed, the water tank body extension part 380 may be located inside the inner body extension part 148. The inner body extension part 148 and the water tank body extension part 380 may overlap each other inside and outside.

The upper end of the air guide 170 may adhere closely to or be coupled to the upper inner body ring 126. The lower end of the air guide 170 may adhere closely to or be coupled to the upper outer body 128.

Accordingly, air flowing through the clean connection flow passage 104 between the upper inner body 140 and the upper outer body 128 may be guided to the upper inlet 121.

The diameter of the upper inner body ring 126 and the diameter of the upper end of the air guide 170 may be the same as or similar to each other. The air guide 170 and the upper inner body ring may adhere closely to each other to prevent leakage of filtered air. The upper inner body ring 126 may be disposed inside the air guide 170.

A grip 129 may be formed on the upper outer body 128. The air wash module 200 may be placed in the upper body, and the whole of the humidification and air cleaning apparatus can be lifted through the grip 129.

The upper inner body 140 may have the water tank insertion space 125 formed therein so as to receive the water tank 300.

The clean connection flow passage 104 may be disposed outside the upper inlet 121, and the water tank insertion space 125 may be disposed inside the upper inlet 121. Air flowing along the clean connection flow passage 104 may pass through the upper inlet 121. When the water tank 300 is placed in the water tank insertion space 125, filtered air passing through the upper inlet 121 may flow into the water tank 300.

Meanwhile, an outer visual body 214 may be coupled to the upper side of the upper body 120.

The outer visual body 214 may be a component of the visual body 210, but in this embodiment, may be fixed to the upper body 120. Unlike this embodiment, the outer visual body 214 may also be fixed to the air wash module 200. Unlike this embodiment, the outer visual body 214 may be omitted.

The outer visual body 214 may be fixed to the upper body 120. In this embodiment, the outer visual body 214 may be coupled to the upper outer body 128. The outer visual body 214 and the outer surface of the upper outer body 128 may form a continuous surface.

The outer visual body 214 may be formed of a material through which a user can see the inside of the outer visual body 214. The outer visual body 214 may be formed of a transparent or translucent material.

A display module 160 may be disposed in at least one of the air clean module 100 or the air wash module 200 to display the operational state to a user. In this embodiment, the display module 160 may be disposed in the base body 110 to display the operational state of the humidification and air cleaning apparatus to a user.

The display module 160 may be disposed inside the outer visual body 214. The display module 160 may be disposed to adhere closely to the inner side surface of the outer visual body 214. When viewed from top, the display module 160 may have a donut shape. The water tank 300 may be inserted into the display module 160.

The display module 160 may be supported by the outer visual body 214. The inner edge of the display module 160 may be supported by the upper inner body ring 126. The display module 160 may be disposed over the air guide 170. The display module 160 may be manufactured integrally with a connector 260.

The display module 160 may be disposed over the air guide 170. The display module 160 may be disposed between the upper outer body 128 and the upper inner body 140. The display module 160 may cover the upper outer body 128 and the upper inner body 140 such that a user cannot see a gap between the upper outer body 128 and the upper inner body 140. The inside and the outside of the display module 160 may be sealed to prevent water from permeating between the upper outer body 128 and the upper inner body 140.

The inside of the display module 160 may be supported by the upper inner body 140, and the outside of the display module 160 may be supported by the outer visual body 218.

In this embodiment, the display 160 may have a ring shape. Unlike this embodiment, the display 160 may be formed into an arc shape. The surface of the display 160 may be formed of a material that can reflect light, or may be coated with a material that can reflect light.

Accordingly, when water drops are formed on the visual body 210, water drops formed on the visual body 210 may be projected onto or reflected by the surface of the display 160. When the water drops formed on visual body 210 flows down, the same effect is also shown on the display 160.

This effect may give a visual stimulus to a user, and a user may intuitively recognize that humidification is being performed. The water drop image projected on the display 160 may give a refreshment feeling to a user, and may allow a user to know the humidification state.

The upper side surface of the display 160 may be obliquely formed. The display 160 may be obliquely disposed toward a user. Accordingly, the inside of the display 160 may be high, and the outside thereof may be low.

Hereinafter, each configuration of the air wash module 200 will be described.

The air wash module 200 may increase humidity in the filtered air. The air wash module 200 may implement a rain view in the humidification flow passage 106. The air wash module 200 may spray and circulate water in the water tank 300. The air wash module 200 may change water into small-sized droplets, and may again wash filtered air through scattered droplets. When filtered air is washed through scattered droplets, humidification and filtering may be performed once again.

The air wash module 200 may include the humidification connection flow passage 105, the humidification flow passage 106, the discharge flow passage 107, and the water supply flow passage 109.

The air wash module 200 may include the water tank 300, the watering unit 400, the humidification medium 50, the visual body 210, the top cover assembly 230, and a handle 180.

The handle 180 may be coupled to the visual body 210, may rotate in the visual body 210, and may be held in the visual body 210. A user may simply lift up only the air wash module 200 through, and may separate the air wash module 200 from the air clean module 100.

The humidification connection flow passage 105 may be disposed outside the water tank 300, and may guide air into the water tank 300. The humidification connection flow passage 105 may be disposed outside the visual body 210, and may guide air into the visual body 210.

The humidification connection flow passage 105 may be disposed at the outside of at least one of the water tank 300 and the visual body 210, and may guide air into one of the water tank 300 and the visual body 210.

The discharge flow passage 107 may be disposed between the top cover assembly 230 and the visual body 210. The discharge flow passage 107 may be disposed in at least one of the top cover assembly 230 and the visual body 210.

In this embodiment, the discharge flow passage 107 may be disposed at the outer edge of the top cover assembly 230, and the water supply flow passage 109 may be disposed at the center of the inside of the top cover assembly 230.

In the humidification and air cleaning apparatus according to this embodiment, a power source may be connected to the air clean module 100, and the air wash module 200 may be supplied with power through the air clean module 100.

Since the air wash module 200 has a structure separable from the air clean module 100, the air clean module 100 and the air wash module 200 may be provided with a separable power supply structure.

Since the air clean module 100 and the air wash module 200 are separably assembled through the upper body 120, a connector 260 may be disposed in the upper body 120 to provide power for the air wash module 200.

The top cover assembly 230 of the air wash module 200 may be provided with a control part and a display which requires power. A top connector 270 may be disposed in the air wash module 200, and may be separably connected to the connector 260. The top connector 270 may be disposed in the top cover assembly 230.

In this embodiment, since the top cover assembly 230 is separable, the inner side surface of the visual body 210 or the inner side surface of the water tank 300 can be conveniently cleaned.

The top cover assembly 230 may include the water supply flow passage 109 formed therein, and may form the discharge flow passage 107 with the visual body 210 in between. The top cover assembly 230 may be installed separably from the visual body 210. The top cover assembly 230 may include the top connector 270 disposed therein and electrically connected to the connector 260.

When the top cover assembly 230 is placed, the top connector 270 may be disposed over the connector 260. The top cover assembly 230 may be supplied with electricity from the connector 260 via the top connector 270.

A water level display part (not shown) may be disposed around the water supply flow passage 109 to display the water level of the water tank 300. Thus, a user can check the water level of the water tank 300 when supplying water. By disposing the water level display part on the movement line of water supply, a user can be prevented from excessively supplying water, and the water tank 300 can be prevented from overflowing.

The water level display part may be disposed in the top cover assembly 230. The separable power supply structure of the top connector 270 and the connector 260 may achieve effective upper water supply.

The water tank 300 may be separably placed in the upper body 120. The watering unit 400 may be disposed inside the water tank 300, and may rotate inside the water tank 300.

The water tank 300 may include a water tank body 320 storing water, an air wash inlet 31 formed at the side surface of the water tank body 320, and a water tank body extension part 380 upwardly extending from the water tank body 320 and coupled to the visual body 210.

In this embodiment, the water tank body 320 may be formed into a cylindrical shape with an opened upper side. Unlike this embodiment, the water tank body 320 may be formed into various shapes.

The water tank body extension part 380 may upwardly extend from the water tank 300. The water tank body extension part 380 may form the air wash inlet 31. The air wash inlet 31 may be formed between the water tank body extension parts 380.

The air wash inlet 31 may be formed in the side surface of the water tank body 320. The air wash inlet 31 may be formed on the water tank body 320 in all directions of 360 degrees of a circumference of the water tank body 320. The air wash inlet 31 may communicate with the humidification connection flow passage 105.

The water tank body extension part 380 may guide water flowing down from the inner side surface of the visual body 210 into the water tank 300. The noise of dropping water can be minimized by guiding water flowing down from the visual body 210.

The water tank body extension part 380 may be coupled to the lower end of the visual body 210.

In this embodiment, the air wash inlet 31 may be formed by the configuration of the water tank body 320. Unlike this embodiment, the air wash inlet 31 may also be formed by disposing the water tank body extension part 380 in the visual body 210. Also unlike this embodiment, a portion of a plurality of water tank body extension parts 380 may be disposed in the water tank 300, and other water tank body extension parts 380 may be disposed in the visual body 210 to configure the air wash inlet 31. Unlike this embodiment, the air wash inlet 31 may also be formed in a separate configuration distinguished from the visual body 210 and the water tank 300. Unlike this embodiment, the air wash inlet 31 may also be formed in the visual body 210 and in the water tank 300.

That is, the air wash inlet 31 may be disposed in at least one of the water tank 300 and the visual body 210. The air wash inlet 31 may be formed by combining the water tank 300 and the visual body 210. The air wash inlet 31 may be disposed in a separate configuration distinguished from the water tank 300 and the visual body 210, and then the separate configuration may be disposed between the water tank 300 and the visual body 210. The air wash inlet 31 may be formed by combination of the water tank 300 and the visual body 210.

The air wash inlet 31 may be disposed at the side of the air wash module 200, and may be connected to the humidification flow passage 106. The air wash inlet 31 may communicate or connect with the humidification connection flow passage 105.

The watering unit 400 may have a function of supplying water to the humidification medium 50. The watering unit 400 may have a function of visualizing the humidification process. The watering unit 400 may have a function of implementing a rain view inside the air wash module 200.

The watering unit 400 may suction water inside the water tank 300 by rotating a watering housing 800, may upwardly pump suctioned water, and then may spray pumped water toward the outside in a radial direction. The watering unit 400 may include the watering housing 800 that suctions water, upwardly pumps suctioned water, and then sprays pumped water toward the outside in a radiation direction.

In this embodiment, the watering housing 800 may be rotated in order to spray water. Unlike this embodiment, water may also be sprayed using a nozzle instead of the watering housing. Water may be supplied to the humidification medium 50 by spraying water from the nozzle, and the rain view may be similarly implemented. According to embodiments, water may be sprayed from the nozzle, and the nozzle may be rotated.

Water sprayed from the watering housing 800 may wet the humidification medium 50. Water sprayed from the watering housing 800 may be sprayed toward at least one of the visual body 210 and the humidification medium 50.

Water sprayed toward the visual body 210 may implement a rain view. Water sprayed toward the humidification medium 50 may be used to humidify filtered air. The rain view may be implemented by spraying water toward the visual body 210, and then water flowing down from the visual body 210 may be used to wet the humidification medium 50.

In this embodiment, a plurality of nozzles having different heights may be disposed on the watering housing 800. Water discharged out of any one nozzle may form droplets on the inner side surface of the visual body 210 to implement a rain view, and water discharged out of another nozzle may wet the humidification medium 50 to be used for humidification.

The watering housing 800 may spray water to the inner side surface of the visual body 210, and sprayed water may flow down along the inner side surface of the visual body 210. Droplets formed in a form of water drop may be formed on the inner side surface of the visual body 210, and a user can see droplets through the visual body 210.

Particularly, water flowing down from the visual body 210 may wet the humidification medium 50 to be used for humidification. The humidification medium 50 may be wetted with water sprayed from the watering housing 800 and water flowing down from the visual body 210.

The visual body 210 may be coupled to the water tank 300, and may be located over the water tank 300. At least a portion of visual body 210 may be formed of a material through which a user can see the inside.

A display module 160 may be disposed outside the visual body 210. The display module 160 may be coupled to any one of the visual body 210 and the upper body 120.

The display module 160 may be disposed on a location where a user can observe a rain view. In this embodiment, the display module 160 may be disposed at the upper body 120.

When the air wash module 200 is placed, the outer surface of the visual body 210 may adhere closely to the display module 160. At least a portion of the surface of the display module 160 may be formed of or coated with a material that reflects light.

Droplets formed on the visual body 210 may also be projected onto the surface of the display module 160. Accordingly, a user can observe the motion of droplets at both visual body 210 and display module 160.

The water tank 300 may include the air wash inlet 31 which is formed thereon and through which air passes. The air wash inlet 31 may be located between the connection flow passage 103 and the humidification flow passage 106. The air wash inlet 31 may be an outlet of the connection flow passage 103, and may be an inlet of the humidification flow passage 106.

Filtered air supplied from the air clean module 100 may flow into the air wash module 200 through the air wash inlet 31.

The humidification medium 50 may include a water tank humidification medium 51 disposed at the inlet of the humidification flow passage 106, and a discharge humidification medium 55 disposed at the outlet of the humidification flow passage 106. The outlet of the humidification flow passage 106 and the inlet of the discharge flow passage 107 may be connected to each other. Accordingly, the discharge humidification medium 55 may be disposed at the discharge flow passage 107.

Since the connection flow passage 103, the humidification flow passage 106, and the discharge flow passage 107 are not formed of structures such as duct, it may be difficult to clearly distinguish the boundaries thereof. However, the humidification flow passage 106 in which humidification is performed is defined as between the water tank humidification medium 51 and the discharge humidification medium 55, the connection flow passage 103 and the discharge flow passage 107 may be naturally defined.

The connection flow passage 103 may be defined as between the blower housing 150 and the water tank humidification medium 51. The discharge flow passage 107 may be defined as after the discharge humidification medium 55.

In this embodiment, the water tank humidification medium 51 may be disposed at the air wash inlet 31 of the water tank 300.

The water tank humidification medium 51 may be located in at least one of the same plane, the outside, and the inside of the air wash inlet 31. Since the water tank humidification medium 51 is wetted with water for humidification, it may be desirable that the water tank humidification medium 51 is located at the inside of the air wash inlet 31.

Water flowing down after wetting the water tank humidification medium 51 may be stored in the water tank 300. Water flowing down after wetting the water tank humidification medium 51 may be configured so as not to flow out of the water tank 300.

Thus, the water tank humidification medium 51 may humidify filtered air passing through the air wash inlet 31.

Water that is naturally evaporated from humidification medium 50 may humidify filtered air. The natural evaporation means that water evaporates in a state where separated heat is not applied to water. As contact with air increases, as the flow velocity of air increases, as the pressure in the air decreases, the natural evaporation may be promoted. The natural evaporation may also be referred to as natural vaporization.

The humidification medium 50 may promote the natural evaporation of water. In this embodiment, the humidification medium 50 may be wetted with water, but may not be immersed in the water tank 300.

Since disposed separately from water stored in the water tank 300, the water tank humidification medium 51 and the discharge humidification medium 55 may not be always wet even though there is water stored in the water tank 300. That is, the water tank humidification medium 51 and the discharge humidification medium 55 may become wet only during the operation of humidification mode, and the water tank humidification medium 51 and the discharge humidification medium 55 may be maintained at a dry state during the operation of air cleaning mode.

The water tank humidification medium 51 may cover the air wash inlet 31, and air may penetrate the water tank humidification medium 51 to flow into the water tank 300.

The discharge humidification medium 55 may be disposed at the outlet of the humidification flow passage 106 or at the inlet of the discharge flow passage 107.

In this embodiment, the discharge humidification medium 55 may be disposed so as to cover the upper part of the visual body 210. The discharge humidification medium 55 may be placed on the visual body 210. Unlike this embodiment, the discharge humidification medium 55 may be coupled to the undersurface of the top cover assembly 230.

The discharge humidification medium 55 may cover the discharge flow passage 107, and humidified air may penetrate the discharge humidification medium 55 and then flow to the discharge flow passage 107.

On the other hand, while the separable structure of the air wash module and the air clean module has been described in this embodiment, the air wash module and the air clean module may have a combined structure in another embodiment, Also in the combined state of the air wash module and the air clean module, filtered air may be provided to the humidification flow passage through the humidification connection flow passage and the clean connection flow passage according to this embodiment. That is, the air flow passages according to this embodiment may propose an effective flow passage which can provide filtered air to the humidification flow passage.

Hereinafter, the flow of air will be described with reference to the accompanying drawings.

When the air blowing unit 20 operates, external air may flow into the base body 110 through the intake flow passage 101 formed at a lower side of the base body 110. Air suctioned through the intake flow passage 101 may sequentially pass the air clean module 100 and the air wash module 200 while moving upward, and may be discharged to the outside through the discharge flow passage 107 formed at an upper side of the air wash module 200.

Air suctioned to the intake flow passage 101 may pass the filtering flow passage 102 of the filter assembly 10, and the filter assembly 10 may filter external air.

Air passing the filtering flow passage 102 may flow to the connection flow passage through the air blowing unit 20. Air passing the filtering flow passage 102 may flow into the air blowing flow passage 108.

The filtered air may be pressurized by the blower fan 24 in the air blowing flow passage 108, and then may flow to the clean connection flow passage 104.

Since the air blowing unit 20 is disposed next to the filtering flow passage 102, the air blowing unit 20 may pressurize and blow filtered air. Through the arrangement relation of the filter assembly 10 and the air blowing unit, adherence of foreign substances like dust on the blower fan 24 can be minimized.

When the air blowing unit 20 is disposed at the front of the filtering flow passage 102, external air may first contact the blower fan 24, and thus the possibility that foreign substances adhere to the blower fan 24 may increase. When the blower fan 24 is contaminated with foreign substances, a user needs to periodically clean the blower fan 24, and a structure for cleaning the blower fan 24 may be needed.

Since the air blowing unit 20 according to this embodiment blows filtered air from which foreign substances are removed, a separate cleaning may not be needed.

Also, since the air blowing unit 20 is disposed at the front of the humidification flow passage 106, adherence of moisture on the surface of the blower fan 24 can be minimized. When moisture adheres to the surface of the blower fan 24, foreign substances may adhere to the surface of the blower fan 24 or molds grow on the blower fan 24.

Since the air blowing unit 20 is disposed at the rear of the filtering flow passage 102 and at the front of the humidification flow passage 106, the contamination of the air blowing unit 20 can be minimized.

The connection flow passage 103 may include the clean connection flow passage 104 formed in the air clean module 100 and the humidification connection flow passage 105 formed in the air wash module 200.

When the air wash module 200 is placed on the upper body 120, the clean connection flow passage 104 and the humidification connection flow passage 105 may be connected to each other. When the air wash module 200 is in a separated state, the clean connection flow passage 104 and the humidification connection flow passage 105 may be exposed to the outside.

The clean connection flow passage 104 may be formed in the upper body 120, and the humidification connection flow passage 105 may be formed in the air wash module 200.

The clean connection flow passage 104 and the humidification connection flow passage 105 may also be formed in a form of duct to form a clear flow passage. In this embodiment, the connection flow passage 103 may distributedly disposed in the structure of the upper body 120 and the structure of the water tank 300.

The connection flow passage 103 may also be formed using a configuration such as duct. However, when air is supplied into the water tank 300 through a structure such as duct, the flow resistance may significantly increase due to the duct, and it may be difficult to secure a sufficient flow rate. When the flow rate supplied into the water tank 300 is limited, RPM of the blower fan 24 needs to increase, and thus power consumption and noise may increase.

In this embodiment, the connection flow passage 103 may provide air to the water tank 300 in all directions of 350 degrees, thereby securing a sufficient flow rate.

Filtered air passing the air blowing flow passage 108 may flow into the clean connection flow passage 104 formed in the upper body 120. The air guide 170 may be disposed in the clean connection flow passage 104 of the upper body 120 to minimize the change of the flow direction of filtered air. The air guide 170 may minimize the change angle of filtered air that flows.

In this embodiment, since the upper inner body 140 forming the water tank insertion space 125 is disposed in the upper body 120, the clean connection flow passage 104 may be directly connected to the air wash inlet 31.

Unlike this embodiment, when the height of the upper inner body 140 is small or zero, the outer wall of the water tank 300 may provide the humidification connection flow passage 105. In other words, when there is only the bottom 141 of the upper inner body 140 and no side wall of the upper inner body 140, the outside of the side wall of the water tank 300 may provide the humidification connection flow passage 105, and the inner side of the air guide 170 may provide the clean connection flow passage 104. Also, when the water tank 300 is placed on the bottom 141, the connection flow passage 103 may be connected.

In this embodiment, filtered air of the clean connection flow passage 104 may sequentially pass the upper inlet 121 and the air wash inlet 31, and then may pass the water tank humidification medium 51 to flow into the humidification flow passage 106.

The humidification flow passage 106 may be a section in which moisture is supplied to filtered air. In this embodiment, the humidification flow passage 106 may be a flow passage or a space from the water tank humidification medium 51 to the discharge humidification medium 55.

In the humidification flow passage 106, humidification may be performed through various paths.

First, in a process where filtered air passes the water tank humidification medium 51, moisture of the water tank humidification medium 51 may be naturally evaporated, and filtered air may be supplied with moisture.

Second, filtered air may be supplied with moisture by water drops scattered from the watering unit 400.

Third, humidification may be performed by moisture that is evaporated in the water tank 300.

Fourth, also in a process where filtered air passes the discharge humidification medium 55, water wetting the discharge humidification medium 55 may be naturally evaporated, and thus filtered air may be supplied with moisture.

Thus, when passing the humidification flow passage 106, filtered air may be supplied with moisture through various paths.

Air passing the discharge humidification medium 55 may be exposed to the outside through the discharge flow passage 107.

Air that is filtered and humidified may be discharged through the discharge flow passage 107. The discharge flow passage 107 may discharge air in all directions of 360 degrees with respect to the upper side and inclined direction.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

A humidification and air cleaning apparatus according to an exemplary embodiment of the present invention has at least one of the following effects.

First, filtered air is generated in the filtered air, and the filtered air is supplied to perform humidification in the air wash module. Also, when a user wants, the air wash module can be separated from the air clean module.

Second, scattering water drops can wash air passing the humidification flow passage.

Third, the air guide can be disposed in the connection flow passage to guide filtered air to the humidification flow passage, and the change angle of air can be minimized through the air guide. Thus, the flow resistance of air can be minimized.

Fourth, the air clean module for filtering air and the air wash module for humidification of air can be separably configured, and only the air wash module that contacts water can be separated for cleaning.

Fifth, a user can check water drops formed on the humidification flow passage with his/her eyes, and thus can intuitively recognize that humidification is being performed.

Sixth, the flow direction of air can form a substantially straight line in the intake flow passage, the filtering flow passage, the humidification flow passage and the discharge flow passage, and the change of the flow direction of air can be minimized in the connection flow passage, thereby minimizing the flow resistance of air.

Seventh, the humidification medium for humidifying filtered air may be spaced from water, and the humidification medium can be maintained at a dry state when humidification mode is not used.

Eighth, the humidification mediums are disposed at both inlet and outlet of the humidification flow passage, and filtered air can be allowed to pass each humidification medium, thereby securing sufficient humidification.

Ninth, since filtered air is supplied in all directions of 360 degrees of the humidification flow passage, the flow rate of air can be sufficiently secured.

Tenth, when the watering unit disposed in the humidification flow passage operates, a rain view effect can be implemented as if it rains in the humidification flow passage, and a user can directly check the rain view with his/her eyes.

Eleventh, when a rain view effect is implemented, a sound as if it actually rains can be created, thereby stabilizing the mind and body.

Twelfth, since the discharge flow passage and the water supply flow passage are separated, water can be prevented from scattering to the outside together with discharged air even though water is supplied when humidification is performed.

The effects of the present invention are not limited to the above; other effects that are not described herein will be clearly understood by the persons skilled in the art from the following claims.

The above-disclosed subject matter is to be considered illustrative and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An air conditioner apparatus comprising:
   an air cleaner comprising a lower body and an upper body disposed above the lower body, the upper body having an outer visual body formed of a transparent material;
   an air washer comprising a water tank to store water and a visual body, the air washer being detachably coupled to the air cleaner; and
   a display module having an annular shape and arranged inside the outer visual body to display an operational state of the air conditioner apparatus to a user,
   wherein the water tank is disposed inside the display module when the air washer is coupled to the air cleaner,
   wherein the display module is at least partially supported by the outer visual body.

2. The air conditioner apparatus of claim 1, further comprising:
   a watering housing to draw water stored in the water tank and to spray the drawn water to an inner surface of the visual body;
   a top cover assembly disposed over the visual body and having a water supply hole to supply water to the water tank;
   a lower humidification medium disposed between the visual body and the water tank, the lower humidification medium containing moisture and humidifying passing-through air;
   a upper humidification medium separably disposed at an upper side of the visual body, the upper humidification medium containing moisture and humidifying passing-through air; and
   wherein the watering housing sprays water to the visual body to supply moisture to the upper humidification medium and the lower humidification medium.

* * * * *